United States Patent [19]
Henning et al.

[11] 3,964,804
[45] June 22, 1976

[54] APPARATUS FOR LUBRICATING BEARING RINGS LOOSELY MOUNTED ON A ROTARY DRUM

[75] Inventors: Kurt Henning; Horst Bonisch, both of Neubeckum, Germany

[73] Assignee: Polysius AG, Neubeckum, Germany

[22] Filed: May 9, 1975

[21] Appl. No.: 575,955

[30] Foreign Application Priority Data
Mar. 27, 1974 Germany............... 7418335[U]

[52] U.S. Cl................ 308/109; 308/239; 308/240
[51] Int. Cl.²........................... F16C 1/24
[58] Field of Search ......... 308/106, 109, 78, 239, 308/240, DIG. 9, DIG. 7

[56] References Cited
UNITED STATES PATENTS

| | | |
|---|---|---|
| 568,642 | 9/1896 | Thomson .................... 308/239 |
| 650,384 | 5/1900 | Feist ........................ 308/106 |
| 742,836 | 11/1903 | Carroll ...................... 308/106 |
| 1,936,894 | 11/1933 | Whiteley .................... 308/240 |
| 2,719,065 | 9/1955 | Hornbostel .................. 308/240 |
| 2,724,945 | 11/1955 | McGhee .................. 308/DIG. 7 |
| 3,149,405 | 9/1964 | Dolan ....................... 308/239 |

Primary Examiner—M. H. Wood, Jr.
Assistant Examiner—Gene A. Church
Attorney, Agent, or Firm—Marshall & Yeasting

[57] ABSTRACT

A bearing ring is loosely mounted on peripherally spaced support plates fixed to a rotary drum. At least one box loosely holding a graphite plate is open on the side facing the inner surface of the bearing ring and is disengageably secured in the space between two adjacent support plates.

9 Claims, 4 Drawing Figures

APPARATUS FOR LUBRICATING BEARING RINGS LOOSELY MOUNTED ON A ROTARY DRUM

BACKGROUND OF THE INVENTION

This invention relates to apparatus for the lubrication of a bearing ring mounted on a rotary drum casing which is movable in the peripheral direction relative thereto, and is supported by support plates affixed to the rotary drum casing at regular intervals.

Bearing rings of the type described are used on rotary kilns, cooling drums, drying drums and other rotary drums. These rings, known as loose bearing rings, are disposed with a predetermined play on support plates on the rotary drum casing, and can move in the peripheral direction relative to the rotary drum casing, i.e. they "wander". This movement of the bearing ring relative to the rotary drum casing can result in wear and damage to the contacting parts. In order to prevent this, the bearing rings are lubricated.

For the lubrication of these bearing rings it is known to use grease, grease pastes or powdered graphite, or mixtures thereof. The lubrication process is usually carried out manually. Here difficulties arise in reaching the parts and surfaces which are to be lubricated, especially with hot rotary kilns and drums. For this purpose the rotary drums are usually temporarily stopped, and apart from the difficulty of the work, this entails undesirable shut down periods for the rotary drums. With hot rotary drums, it has also been found that because of the high temperature the lubricating greases liquefy and flow way, or are burned to solid residues. In addition the lubricants can vaporise at high temperatures, resulting in unhealthful and partly inflammable clouds of vapour. Also liquid lubricants running away cause undesired soiling of the rotary drum casing. If in order to simplify the lubricating procedure, lubricant conduits and nipples for lubrication with grease guns were provided, this would lead to undesirably high expenditure, without satisfactorily overcoming the defects mentioned above. In addition the application of pure powdered graphite also involves considerable difficulties.

SUMMARY OF THE INVENTION

The invention is directed to the problem of avoiding these disadvantages by providing apparatus which at relatively low cost produces simple and reliable lubrication of the bearing rings.

According to the invention this problem is solved in that at least one box open towards the inner peripheral surface of the bearing ring, with a loosely inserted graphite plate, is disengageably held between support plates. A sheet metal box of this type can be made extremely cheaply and matched to the space between two support plates which are adjacent in the peripheral direction. If a graphite plate is inserted in such a box, and the box is arranged so that it is open towards the inner peripheral surface of the bearing ring, during the rotary movement of the drum small particles of graphite are rubbed off and released; during further rotary movement these particles then reach the inner peripheral surface of the bearing ring, which they lubricate. Depending on the size of the rotary drum exterior and the number and nature of the parts to be lubricated, a plurality of such boxes containing graphite plates can naturally be distributed over the periphery of the rotary drum; in the extreme case every gap between two peripherally adjacent support plates may contain such a box. These boxes can then be checked from time to time, for example while the rotary drum has been stopped for some purpose, and if necessary can be supplied with new graphite plates.

DESCRIPTION OF THE PREFERRED EMBODIMENT

Figure 1:
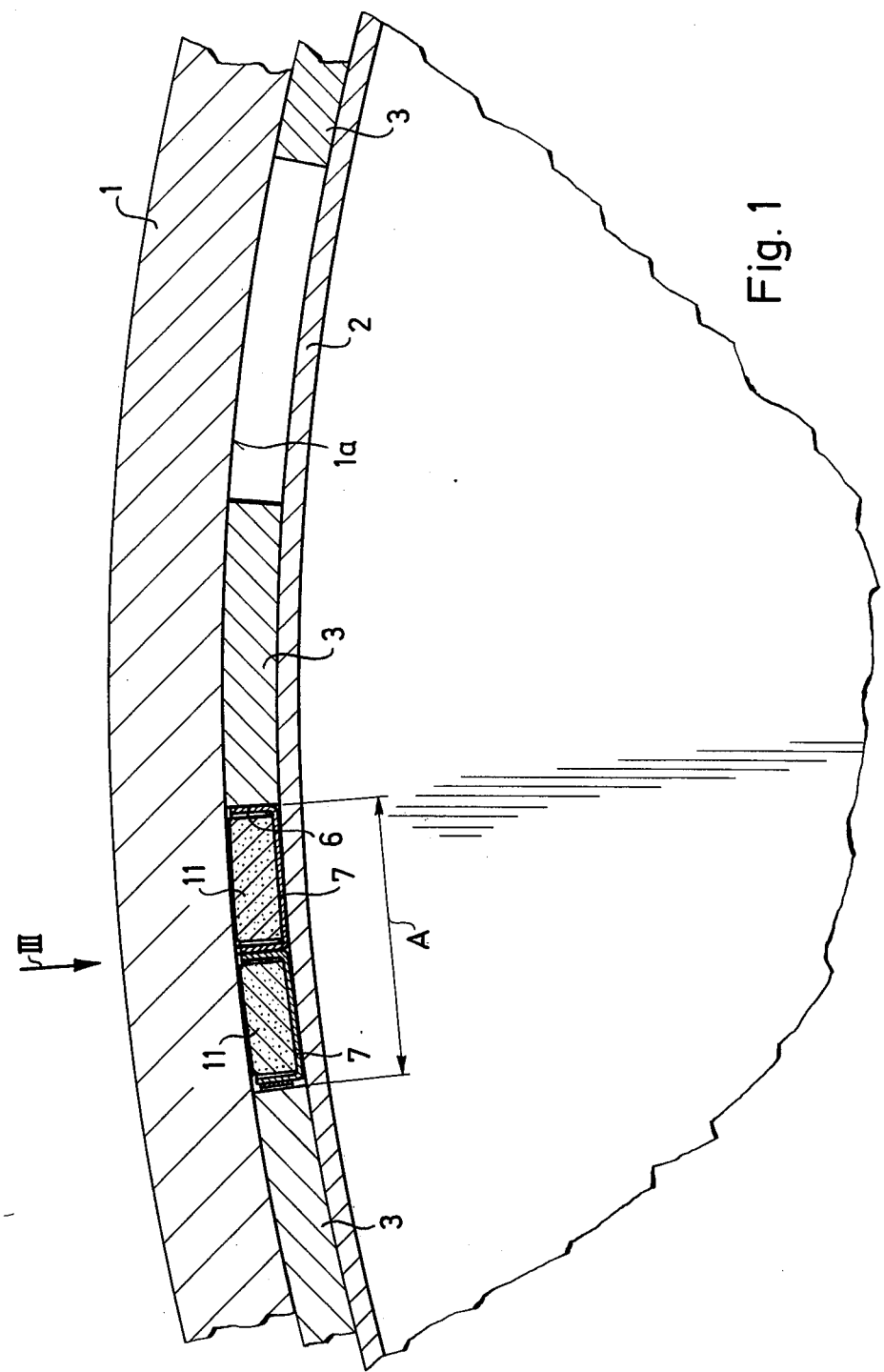
FIG. 1 is a fragmentary transverse section of a rotary drum with lubrication means for a movable bearing ring, in accordance with the invention.

The device in accordance with the invention is used for lubricating a bearing ring 1 which is provided on the casing 2 of a rotary drum and is movable relative thereto in the peripheral direction; this ring is what is called a loose bearing ring. The bearing ring 1 is borne by support plates 3 comprising strips affixed to the outer periphery of the rotary drum casing, at regular intervals from each other in the peripheral direction. The support plates 3 are curved to match the periphery of the rotary drum. The bearing ring 1 is disposed on the support plates 3 with a predetermined clearance, and in the embodiment shown is held in its axial position by limiting rings 4, 5 at both of its lateral faces (see FIG. 4). These two limiting rings 4, 5 are also mounted on the support plates 3.

In order to be able to supply the inner peripheral surface 1a of the bearing ring 1 with lubricant, in particular graphite, at least one lubricant box 7 is disengageably held in at least one gap 6 between two support plates 3 which are adjacent to each other in the peripheral direction; in the embodiment shown, two similarly formed lubricant boxes 7 are inserted in the gap 6. Each box 7 is open towards the inner peripheral surface 1a of the bearing ring 1. Also in each box 7 there is loosely inserted a graphite plate which constitutes the lubricant.

Figure 2:
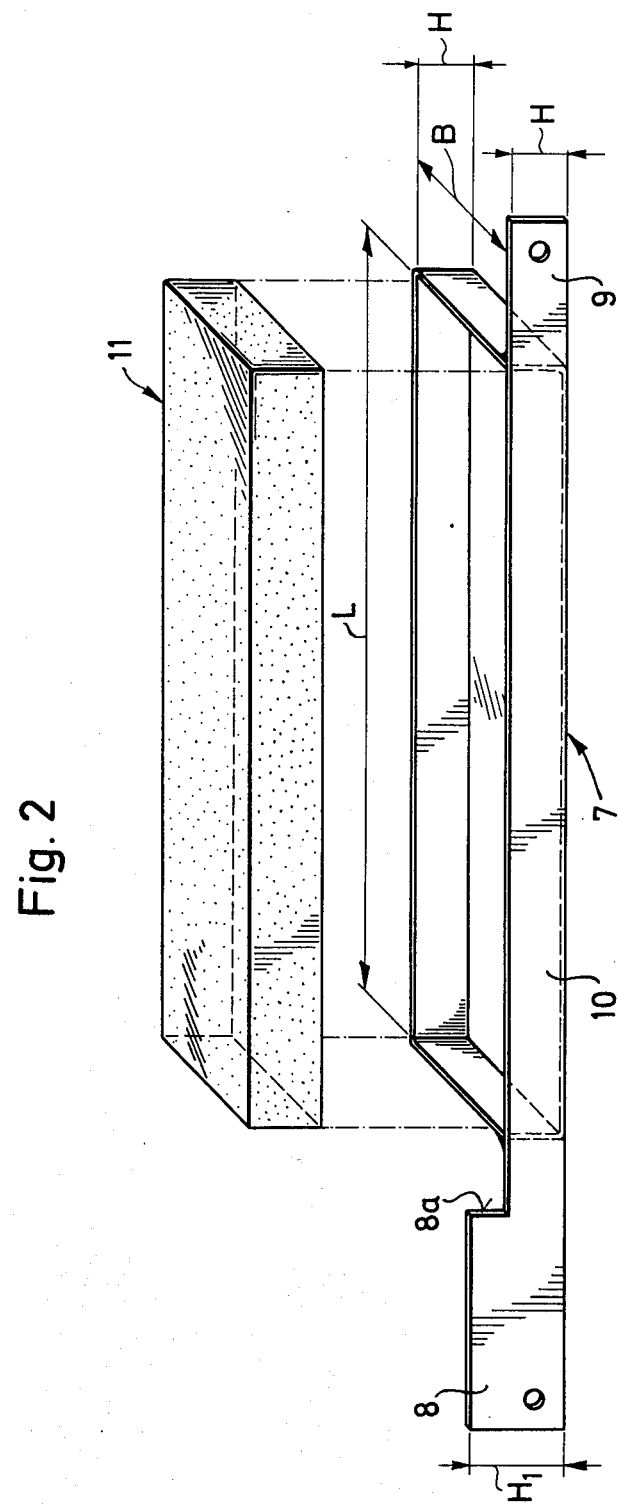
FIG. 2 is a perspective view of a box in accordance with the invention and a graphite plate to be inserted therein.

FIG. 2 shows the construction of a lubricant box 7, made in this case of sheet metal; if desired, it would be possible to use another suitable material, for instance a plastic suitable for the particular usage involved. The box 7 is only open at the side directed towards the inner peripheral surface 1a of the bearing ring 1. The box 7, which in this case has an extended rectangular shape, has a length L corresponding generally to the width of the bearing ring 1; its height H corresponds generally to the depth of the gap between the rotary drum casing 2 and the inner peripheral surface 1a of the bearing ring 1. The outer width B of the box 7 is slightly less than half the gap A between the two peripherally adjacent support plates 3, between which the box is inserted, so that the two boxes 7 inserted in the gap 6 fill said gap. If desired a leaf spring or the like can be provided at the longitudinal side of one box in contact with a support plate 3, so that the two boxes will not rattle during the rotary movement of the drum.

In order that a box 7 may also be held fast in the axial direction, the box has two attachment tags 8, 9, formed in this case by prolonging the one longitudinal wall 10 beyond its two ends. When the box 7 is inserted in the gap 6, the two attachment tags 8, 9 thus project at either side of the bearing ring 1.

As may also be seen from FIG. 2, the one attachment tag 9 has the same height as the longitudinal wall 10 of the box. However the other attachment tag 8 is only carried on at the same height as the longitudinal wall 10 for a distance which corresponds to the width of a lateral limiting ring 4 or 5, while the remaining part of this attachment tag 8 has a height $H_1$, greater than the height H of the box 7. The box 7 can thus only be inserted into the gap 6 in the axial direction from one side, until the raised part of the attachment tag 8 has its abutment 8a lying against the corresponding limiting ring 4 or 5. The box 7 then has its required axial setting in the gap 6 below the bearing ring 1. A correspondingly shaped graphite plate 11 is loosely inserted in the box 7.

Figure 3:
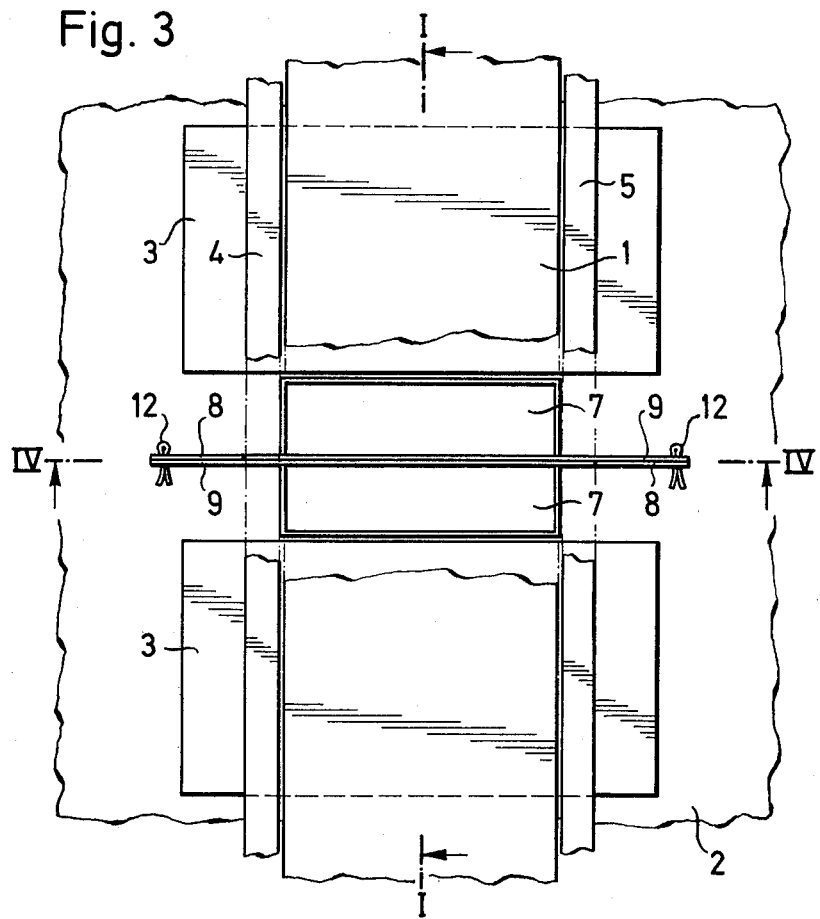
FIG. 3 is a fragmentary plan view in the direction of arrow III in FIG. 1, showing two boxes inserted.
Figure 4:
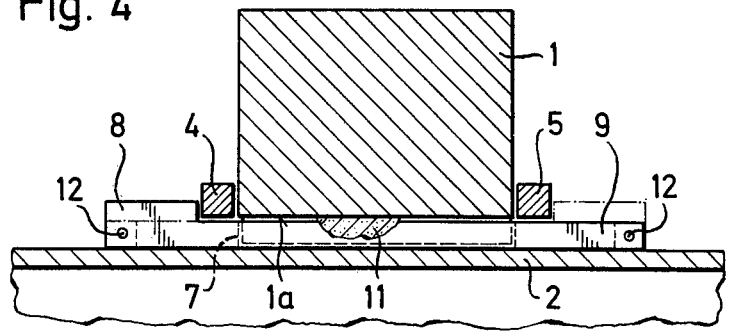
FIG. 4 is a section on the line IV—IV of FIG. 3.

As may be seen especially from FIGS. 3 and 4, the two boxes 7 are slid axially into the gap 6 between adjacent support plates from opposite sides of the bearing ring 1. With the two boxes in inserted condition their two longitudinal sides 10 are thus in contact, and the raised tags 8 are on opposite sides of the bearing ring 1, so that the attachment tag abutment 8a of one box 7 is against the limiting ring 4, and the attachment tag abutment 8a of the other box 7 is against the other limiting ring 5. The attachment tags 8, 9 of the two boxes 7, adjacent each other on both sides of the bearing ring 1 can be firmly affixed to each other by cotter pins 12 or other releasable fastening means, so that both lubricant boxes 7 are thus fixed in place axially of the bearing ring.

In addition to the embodiment described, it is naturally also possible to provide only one lubricant box instead of two in the gap between two adjacent support plates. In order to hold a lubricant box in place it is also possible to apply an attachment tag to the end face of the box, extending parallel to the corresponding face of a lateral limiting ring and attachably affixed thereto in a suitable manner.

What we claim is:

1. Apparatus comprising a rotary drum casing, support plates affixed to said casing at regular intervals around its periphery, and a bearing ring which is carried by the support plate and is free to rotate relative to said casing, wherein the improvement comprises at least one box which is disengageably mounted in the space between two adjacent support plates and is open on the side facing the inner surface of the bearing ring, and a graphite plate for lubricating such inner surface which is loosely held in said box.

2. Apparatus according to claim 1, wherein the box has a length substantially equal to the width of the bearing ring and a height slightly less than the gap between the periphery of the drum casing and the inner surface of the bearing ring.

3. Apparatus according to claim 2, wherein the box has at least at one end an attachment tag projecting beyond the length of the box.

4. Apparatus according to claim 3, wherein the attachment tag constitutes an extension of a longitudinal wall of the box.

5. Apparatus according to claim 1, wherein two boxes, each loosely holding a graphite plate, are disengageably secured in the space between two adjacent support plates, the total width of the boxes being sufficient to fill such space.

6. Apparatus according to claim 5, wherein at their adjacent longitudinal sides the boxes each have two straight attachment tags each constituting an extension of the longitudinal side of the box, projecting at one side of the bearing ring, one tag on each box having the same height as said side, and the other tag on each box having a greater height, the two tags of greater height being on opposite sides of the bearing ring, and each adjacent pair of tags being fixed together by means of a releasable fastener.

7. Apparatus according to claim 1, wherein the box is made of sheet metal.

8. Apparatus according to claim 1, wherein the box is made of plastic.

9. Apparatus according to claim 1 wherein a leaf spring is provided between a longitudinal side of the box and the adjacent support plate.

* * * * *